(12) United States Patent
Kim

(10) Patent No.: US 7,405,249 B2
(45) Date of Patent: Jul. 29, 2008

(54) HIGH FLOW POLYESTER COMPOSITION, METHOD OF MANUFACTURE, AND USES THEREOF

(75) Inventor: Sung Dug Kim, Newburgh, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/581,245

(22) Filed: Oct. 16, 2006

(65) Prior Publication Data

US 2007/0049701 A1    Mar. 1, 2007

Related U.S. Application Data

(63) Continuation-in-part of application No. 11/216,792, filed on Aug. 31, 2005.

(51) Int. Cl.
*C08K 5/15* (2006.01)
(52) U.S. Cl. .................. 524/114; 524/244; 524/245; 524/247; 524/248; 524/250
(58) Field of Classification Search ................ 524/114, 524/244, 245, 247, 248, 250
See application file for complete search history.

(56) References Cited

U.S. PATENT DOCUMENTS

| | | | |
|---|---|---|---|
| 2,465,319 A | 3/1949 | Whinfield et al. |
| 3,078,254 A | 2/1963 | Zelinski et al. |
| 3,265,765 A | 8/1966 | Holden et al |
| 3,297,793 A | 1/1967 | Dollinger |
| 3,402,159 A | 9/1968 | Hsieh |
| 3,405,198 A | 10/1968 | Rein et al. |
| 3,594,452 A | 7/1971 | De La Mare et al. |
| 3,769,260 A | 10/1973 | Segal |
| 4,119,607 A | 10/1978 | Gergen et al. |
| 4,154,775 A | 5/1979 | Axelrod |
| 4,172,859 A | 10/1979 | Epstein |
| 4,292,233 A | 9/1981 | Binsack et al. |
| 4,327,764 A | 5/1982 | Biederman et al. |
| 4,338,245 A | 7/1982 | Halpern |
| 4,364,280 A | 12/1982 | Kutsay |
| 4,739,012 A | 4/1988 | Hagman |
| 4,753,980 A | 6/1988 | Deyrup |
| 5,068,283 A | 11/1991 | Ohmae et al. |
| 5,302,645 A | 4/1994 | Nakano et al. |
| 5,367,011 A | 11/1994 | Walsh |
| 5,411,999 A | 5/1995 | Gallucci |
| 5,424,344 A | 6/1995 | Lewin |
| 5,596,049 A | 1/1997 | Gallucci et al. |
| 5,681,879 A | 10/1997 | Yamamoto et al. |
| 5,804,654 A | 9/1998 | Lo et al. |
| 6,025,419 A | 2/2000 | Kasowski et al. |
| 6,255,371 B1 | 7/2001 | Schlosser et al. |
| 6,822,025 B2 | 11/2004 | Bajgur et al. |

FOREIGN PATENT DOCUMENTS

| | | |
|---|---|---|
| EP | 0682057 A1 | 11/1995 |
| EP | 1041109 A2 | 10/2000 |
| GB | 1264741 | 2/1972 |

OTHER PUBLICATIONS

JP 10-310690; Publication Date: Nov. 24, 1998 (translation of abstract only).

*Primary Examiner*—Peter D Mulcahy
(74) *Attorney, Agent, or Firm*—Cantor Colburn LLP

(57) ABSTRACT

A high flow polyester composition is disclosed, which comprises at least one polyester, at least one flow enhancing ingredient of structure (III),

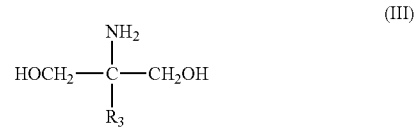

wherein $R_3$ is a C1-C20 alkyl group optionally having one or more hydroxy group substituents, a C3-C20 cycloalkyl group, a C6-C20 aryl group, a C1-C20 alkoxy group optionally having one or more hydroxy group substituents, or a C6-C20 aryloxy group; and an aromatic epoxy compound, in an amount sufficient to provide 5 to 300 milliequivalents of epoxy per kilogram of polyester. The composition further optionally comprises reinforcing fillers, impact modifiers, a property-enhancing thermoplastic such as polycarbonate and flame retardant chemicals. The compositions are suitable for making automotive, electric and electronic parts.

30 Claims, No Drawings

HIGH FLOW POLYESTER COMPOSITION, METHOD OF MANUFACTURE, AND USES THEREOF

CROSS-REFERENCE TO RELATED APPLICATION

This application claims priority to and is a continuation-in-part of U.S. application Ser. No. 11/216,792, filed Aug. 31, 2005, which is incorporated herein by reference in its entirety.

BACKGROUND OF THE INVENTION

The invention relates to a molding composition comprising polyester or its blends with other thermoplastics in the presence of a fluidity enhancer to decrease melt viscosity and improve processability.

Polyesters, copolyesters and their blends with other thermoplastics are employed in making injection molded parts, films, blow-molded goods, pultruded sheets etc. These articles are used in automotive, electrical and electronic applications. The mechanical strength, electrical insulation and easy processability are some of the key characteristics of polyesters, which enable their use in these applications. The current industrial trend is about fabrication of parts with complicated and fine designs with small flow cross-sectional areas, where fluidity of conventional polyesters has been found inadequate.

To address the demanding requirements of high melt flowability, a polyester resin can be replaced by another polyester resin having lower viscosity, but such low viscosity polyester adversely affects the mechanical strength of the molded parts. The challenge therefore is to achieve high flowability of polyester molding compositions without affecting their mechanical strength.

Among the various approaches known in reducing the melt viscosity of polymers such as polyamides and polyphenylene ethers, the use of flow-enhancing hydroxyl compounds is one of them. It has the potential to provide the advantage of not having the need to modify the polymers and hence offers the scope of retaining most of the mechanical properties if used in effective small amounts. The following is a discussion of prior art in this area.

A U.S. patent publication, U.S. Pat. No. 6,822,025 discloses the flow enhancement of a flame retardant composition based on polyphenylene ether/polystyrene resins by using polyhydric alcohols such as pentaerythritol, dipentaerythritol, pentitols, hexitols or saccharides as a flow-enhancing additive. The '025 patent discloses that about 20% flow enhancement is achieved without loss of mechanical properties. However, as per '025 patent, the flow dependence is nearly independent of the amount of pentaerythritol used beyond 0.5% usage of pentaerythritol.

A European patent publication, EP 1 041 109A2 describes the flow enhancement of glass filled polyamide compositions by using a polyhydric alcohol having melting point between 150 and 280 deg C., for example, pentaerythritol or dipentaerythritol. In polyamide compositions, both pentaerythritol and dipentaerythritol showed identical flow enhancing effects. In their study they also demonstrated that simple diol such as 1,6-hexane diol is not effective as a flow promoting additive.

A European patent publication, EP 0 682 057A1 describes the flow enhancement of polyamide and polyester compositions with retention of mechanical properties by using dendrimeric additives. Dendrimeric compounds in general are prepared in several separate steps from basic raw materials and are expensive.

A Japanese patent publication, JP 10310690 discloses the use of pentaerythritol or 1,1,1-tris(hydroxymethyl)ethane and 1,1,1-tri(hydroxymethyl)propane in a polybutylene terephthalate resin for enhancing melt flow. The effect of these flow enhancing additives on other properties of the matrix resin and the effect of other ingredients in the formulations were not disclosed.

Aside the above references on the flow enhancing properties of polyhydric alcohols such as pentaerythritol, a few other polyester flame retardant compositions have been known where pentaerythritol has been disclosed as a char-forming additive. The char formation from polyhydric alcohol in the presence of acidic compounds is well documented in literature.

The U.S. patent publication, U.S. Pat. No. 4,338,245 describes the use of pentaerythritol, dipentaerythritol or tripentaerythritol as a char-forming additive in polybutylene terephthalate resin containing melammonium pentate as flame retardant. No flow or mechanical properties of these compositions were described in this '245 disclosure.

U.S. Pat. No. 5,424,344 discloses the use of pentaerythritol as a char former in polyester composition containing hexavalent sulfur compound as a flame retardant, in addition to other components such as reinforcing fillers, fluoro polymer as a flow-enhancing additive etc. No mention of heat-ageing stability of such compositions, nor flow enhancement due to pentaerythritol were disclosed in this publication.

U.S. Pat. No. 6,025,419 discloses the use of pentaerythritol as a char former in a polyester composition containing glass or mineral reinforcing fillers along with a melamine polyphosphate as a flame retardant material. No effect on flow or mechanical properties or heat-aging stability were disclosed in this patent publication.

U.S. Pat. No. 5,681,879 discloses the use of pentaerythritol or dipentaerythritol or 1,1,1-trimethylolpropane in a flame retardant polyester composition containing halogenated flame retardants in combination with a synergist, antimony trioxide. Neither the flow enhancement due to these polyhydric alcohols nor the effect of other ingredients on the flow-promoting role of these additives was disclosed in this publication.

Flow promotion in the case of polyphenylene ether/polystyrene could be a result of plasticizing action of polyhydric alcohol melts formed at high temperatures prevailing in processing conditions. A hydroxy functional molecule may not react with polyphenylene ether derived from dialkyl phenols or polystyrene derived from styrene monomers, as these polymers do not have reactive functional groups that can react with a hydroxy group. Similar scenario prevails in the case of polyamides, as alcoholysis of amide group is usually difficult (Smith and March, p. 488, Advanced Organic Reactions-Reactions, Mechanisms, and Structure, John-Wiley, 5th edition, 2001) and requires highly reactive catalysts such as titanium tetrachloride or triflic anhydride. The added polyhydric alcohols could remain as plasticizing domains in polyamide media thus giving rise to flow improvement of polyamides as suggested by the melting point range preference for the added polyhydric alcohols in polyamide compositions (reference: EP 1 041 109A2). On the contrary, flow promotion in polyesters by use of polyhydric alcohols poses special challenges owing to the propensity of polyesters to undergo reactions with hydroxy with a likelihood of changes in mechanical properties of polyesters. From our study on the effect of ingredients on flow promoting properties of some hydroxyl or amino functional molecules, we report herein surprising improvements on the flow and thermal ageing resistance properties of polyester compounds without sacrificing mechanical properties due to inventive compositions disclosed herein.

BRIEF DESCRIPTION OF THE INVENTION

The present invention is aimed at providing a polyester composition, which is of high flowability, good mechanical properties, and good heat-aging stability and/or hydrostability. One embodiment of the present invention is a polyester composition comprising of a polyester and an alcohol ingredient of structural formula (I),

(I)

where, $R_1=NH_2$ or $CH_2OH$; and $R_2=CH_3$, $CH_3CH_2$ or $CH_2OH$ or any of C1-C20 alkyl group which may have one or more hydroxy group substituent, C3-C20 cycloalkyl group, C6-C20 aryl group, C1-C20 alkoxy group which may have one or more hydroxy group substituent or C6-C20 aryloxy group.

In another embodiment, the composition additionally comprises of an acrylic impact modifier, a reinforcing filler or a flame retardant chemical.

In yet another embodiment, the composition additionally comprises a thermoplastic resin other than an impact modifier.

In another aspect, the present disclosure relates to a composition comprising a polyester and an aminoalcohol of structural formula (III)

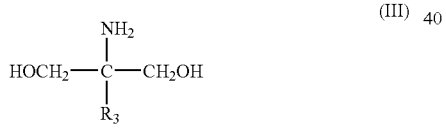

(III)

wherein $R_3=CH_3$, $CH_2CH_3$ or $CH_2OH$ or any of C1-C20 alkyl group which may have one or more hydroxy group substituents, C3-C20 cycloalkyl group, C6-C20 aryl group, C1-C20 alkoxy group which may have one or more hydroxy group substituents or C6-C20 aryloxy group; and an aromatic epoxy compound, in an amount sufficient to provide 5 to 300 milliequivalents of epoxy per kilogram of polyester.

Another aspect of the present disclosure relates to an article comprising the polyester, the aromatic epoxy compound, and the alcohol of formula (III).

Also described is a method of forming an article comprising the polyester, the aromatic epoxy compound, and the amino alcohol of formula (III).

Various other features, aspects, and advantages of the present invention will become more apparent with reference to the following description, examples, and appended claims.

DETAILED DESCRIPTION OF THE INVENTION

The invention is based on the unexpected discovery that specific hydroxyl- or amino-functional molecules can improve the flow and thermal ageing resistance properties of polyester compounds. Such improvement can be obtained without sacrificing other advantageous mechanical properties. In addition, the inventors have unexpectedly found that use of a specific type of aminohydroxy-functional molecule in combination with a specific type of epoxide (an aromatic epoxide) can provide further improvements in flow and thermal aging resistance. Unexpectedly, these improvements are not observed when the hydroxyl-functional compound is substituted for the aminohydroxy-functional compound.

The present invention may be understood more readily by reference to the following detailed description of preferred embodiments of the invention and the examples included herein. In this specification and in the claims, which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

In one embodiment, the polyester composition comprises polyester resins. Methods for making polyester resins and the use of polyester resins in thermoplastic molding compositions are known in the art. Conventional polycondensation procedures are described in the following, see, generally, U.S. Pat. Nos. 2,465,319; 5,367,011 and 5,411,999, the respective disclosures of which are each incorporated herein by reference.

Typically polyester resins include crystalline polyester resins such as polyester resins derived from an aryl, aliphatic or cycloaliphatic diol, or mixtures thereof, containing from 2 to about 10 carbon atoms or from 2 to about 20 carbon atoms and at least one aromatic, aliphatic or cycloaliphatic dicarboxylic acid. Preferred polyesters are derived from an aliphatic diol and an aromatic dicarboxylic acid and have repeating units according to structural formula (II)

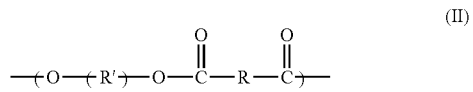

(II)

wherein, R' is an alkyl radical compromising a dehydroxylated residue derived from an aliphatic or cycloaliphatic diol, or mixtures thereof, containing from 2 to about 20 carbon atoms. R is an aryl radical comprising a decarboxylated residue derived from an aromatic, aliphatic, or cycloaliphatic dicarboxylic acid, or a chemical equivalent thereof. In one embodiment of the present invention the polyester could be an aliphatic polyester where at least one of R' or R is a cycloalkyl containing radical. The polyester is a condensation product where R' is the residue of an aryl, alkane or cycloaliphatic diol having 2 to 20 carbon atoms or chemical equivalent thereof, and R is the decarboxylated residue derived from an aryl, aliphatic or cycloaliphatic diacid of 6 to 20 carbon atoms or chemical equivalent thereof. Specific polyesters include poly(alkylene phthalate)s, poly(alkylene isophthalate)s, poly(alkylene terephthalate)s, poly(cycloalkylene terephthalate), poly(cycloalkylene cycloaliphatic dicarboxylate), poly(alkylene dicarboxylate), and the like. The polyester resins are typically obtained through the condensation or ester interchange polymerization of the diol or diol equivalent component with the diacid or diacid chemical equivalent component.

The diacids meant to include carboxylic acids having two carboxyl groups each useful in the preparation of the polyester resins of the present invention are preferably aliphatic, aromatic, cycloaliphatic. Examples of diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or a chemical equivalent. Linear dicarboxylic acids like adipic acid, azelaic acid, dicarboxyl dodecanoic acid, and succinic acid may also be useful. Chemical equivalents of these diacids include esters, alkyl esters, e.g., dialkyl esters, diaryl esters, anhydrides, salts, acid chlorides, acid bromides, and the like. Examples of aromatic dicarboxylic acids from which the decarboxylated residue R may be derived are acids that contain a single aromatic ring per molecule such as, e.g., isophthalic or terephthalic acid, 1,2-di(p-carboxyphenyl)ethane, 4,4'-dicarboxydiphenyl ether, 4,4'-bisbenzoic acid and mixtures thereof, as well as acids contain fused rings such as, e.g., 1,4- or 1,5-naphthalene dicarboxylic acids. In a preferred embodiment, the dicarboxylic acid precursor of residue R is terephthalic acid or, alternatively, a mixture of terephthalic and isophthalic acids.

Some of the diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2- methyl, 1,3-propane diol; 1,4-butane diol, 1,4-but-2-ene diol, 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. Chemical equivalents to the diols include esters, such as dialkylesters, diaryl esters, and the like. Typically the polyester resin may comprise one or more resins selected from linear polyester resins, branched polyester resins and copolymeric polyester resins. In one embodiment, the diol precursor of residue R' is a $C_2$-$C_4$ alkanediol or a chemical equivalent thereof. In yet another embodiment, the diol precursor of residue R' is a $C_2$-$C_4$ alkanediol or a chemical equivalent thereof, and the dicarboxylic acid precursor of residue R is derived from a mixture of terephthalic acid and isophthalic acid or a chemical equivalent thereof.

In one embodiment, the above polyesters with about 1 to about 70% by weight, of units derived from polymeric aliphatic acids and/or polymeric aliphatic polyols to form copolyesters. The aliphatic polyols include glycols, such as poly(ethylene glycol) or poly(butylene glycol). In another embodiment suitable copolymeric polyester resins include, e.g., polyesteramide copolymers, cyclohexanedimethanol-terephthalic acid-isophthalic acid copolymers and cyclohexanedimethanol-terephthalic acid-ethylene glycol ("PCTG" or "PETG") copolymers. When the molar proportion of cyclohexanedimethanol is higher than that of ethylene glycol the polyester is termed PCTG. When the molar proportion of ethylene glycol is higher than that of cyclohexane dimethanol the polyester is termed PETG.

The most preferred polyesters are poly(ethylene terephthalate) ("PET"), and poly(1,4-butylene terephthalate), ("PBT"), poly(ethylene naphthalate) ("PEN"), poly(butylene naphthalate), ("PBN"), poly(propylene terephthalate) ("PPT"), poly(cyclohexane dimethanol terephthalate), (PCT), poly(cyclohexane-1,4-dimethylene cyclohexane-1,4-dicarboxylate) also referred to as poly(1,4-cyclohexane-dimethanol 1,4-dicarboxylate) (PCCD) and the copolyesters PCTG and PETG.

The preferred polyesters are preferably polyester polymers have an intrinsic viscosity (as measured in phenol/tetrachloro ethane (60:40, volume/volume ratio) at 25° C.) ranging from at least about 0.4 to about 2.0 deciliters per gram. Polyesters branched or unbranched and generally will have a weight average molecular weight of from about 5,000 to about 130,000 g/mol, specifically 10,000 to about 120,000 g/mol against polystyrene standard, as measured by gel permeation chromatography in chloroform/hexafluoroisopropanol (5:95, volume/volume ratio) at 25° C. It is contemplated that the polyesters have various known end groups.

A mixture of polyester resins with differing viscosities may be used to make a blend to allow for control of viscosity of the final formulation. Blends of polyesters may also be employed in the composition. Preferred polyester blends are made from poly(ethylene terephthalate) and poly(1,4-butylene terephthalate).

The polyester component may be prepared by procedures well known to those skilled in this art, such as by condensation reactions. The condensation reaction may be facilitated by the use of a catalyst, with the choice of catalyst being determined by the nature of the reactants. The various catalysts for use herein are very well known in the art and are too numerous to mention individually herein. Generally, however, when an alkyl ester of the dicarboxylic acid compound is employed, an ester interchange type of catalyst is preferred, such as $Ti(OC_4H_9)_6$ in n-butanol.

Depending on the nature of applications, the amount of polyester used in a composition varies. For example, in automotive applications and transparent film applications, blends of polycarbonate and polyester are preferred, where, the polyester amount being <40%. Normally, in electrical and electronic applications, the compositions comprise predominantly polyester in an amount of >60%.

The polyhydric alcohol additive used in the polyester compositions of this invention correspond to the structure, I,

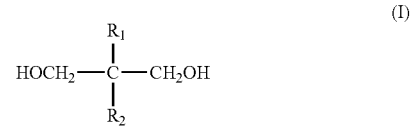

where, $R_1$=$NH_2$ or CH2OH; and $R_2$=$CH_3$, $CH_3CH_2$ or $CH_2OH$ or any of C1-C20 alkyl group which may have one or more hydroxy group substituent, C3-C20 cycloalkyl group, C6-C20 aryl group, C1-C20 alkoxy group which may have one or more hydroxy group substituent or C6-C20 aryloxy group. A structure with at least three hydroxymethyl groups or at least two hydroxymethyl groups and one amino group is preferred.

Examples of compounds represented by the formula I include 1,1-dimethylol-1-aminoethane (DAE), 1,1-dimethylol-1-aminopropane (DAP), tris(hydroxymethyl)aminomethane (THAM), 1,1,-trimethylolpropane (TMP), 1,1,1-trimethylolethane, pentaerythritol (PETOL), dipentaerythritol, tripentaerythritol and 1,1,1-trimethylol pentane. Of these compounds, THAM, DAP, TMP and PETOL are more preferred. There are contradictory conclusions on the reactivity of amino group-containing alcohol, THAM relative to PETOL. Their relative reactivities with small molecule ester bonds depend on conditions employed. (Reference: T. C. Bruice and J. L. York., J. Am Chem. Soc., 1961, 83, p. 1382).

It has further unexpectedly been discovered that use of the aminoalcohol in combination with an aromatic epoxy compound results in improvements in melt flow without sacrificing resistance to hydrolytic environments and to heat aging, and establishes a balance of improved flow properties and physical resistance. This improvement is not observed with other epoxy compounds or with the compound containing solely hydroxyl groups.

Exemplary aminoalcohol additives correspond to the structure (III),

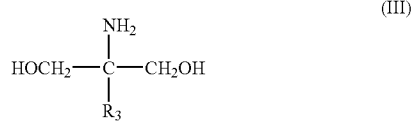

wherein $R_3$ is as defined above, that is, $R_3$ is a C1-C20 alkyl group optionally substituted with one or more hydroxy group substituents, a C3-C20 cycloalkyl group, a C6-C20 aryl group, a C1-C20 alkoxy group optionally substituted with one or more hydroxy group substituents, or a C6-C20 aryloxy group. In one embodiment, $R_3$ is $CH_3$, $CH_2CH_3$, or $CH_2OH$. Mixtures of different polyhydric alcohols can be used.

Examples of compounds represented by the formula (III) include 1,1-dimethylol-1-aminoethane (DAE), 1,1-dimethylol-1-aminopropane (DAP), and tris(hydroxymethyl)aminomethane (THAM). Of the preceding alcohols, THAM and DAP are advantageous.

In this embodiment, the aminoalcohol is amount of 0.05 to 2% by weight, specifically 0.1 to 1% by weight of the polyester in the composition.

"Aromatic epoxy compounds" as used herein refer to compounds comprising at least one aromatic moiety and at least one epoxy functionality. Other functional groups, e.g., carboxylic acids, carboxylic acid esters, halogens, nitrile, nitro, sulfhydryl, alkoxy, aryloxy, and the like can also be present. In one embodiment, the aromatic epoxy compound will contain only carbon, hydrogen and oxygen, and will have an epoxy equivalent weight of 10 to 5,000, more specifically 50 to 4,000, even more specifically 100 to 3,000.

Exemplary aromatic epoxy compounds correspond to the structure (IV)

wherein $R^{a'}$ and $R^{b'}$ are each independently halogen or $C_{1-12}$ alkyl, $X^a$ is a substituted or unsubstituted $C_{1-18}$ alkylidene bridging group or a substituted or unsubstituted $C_{3-18}$ cycloalkylidene bridging group, n is 1 to 6, and r and s are each independently 0 to 4. Exemplary aromatic alcohols of this type include bisphenol epoxy resins, specifically bisphenol-A epoxy resins, bisphenol-F epoxy resins, and the like. The aromatic epoxy compounds are commercially available.

Effective amounts of the aromatic epoxy compound are readily determined by one of ordinary skill in the art without undue experimentation, based on the amount and type of polyester, the amount and type of epoxide, and the amount and type of catalyst, using the guidance provided herein. Typically, small amounts are used, for example amounts effective to provide 5 to 300 milliequivalents of epoxy per kg of polyester, more specifically, 15 to 100 milliequivalents of epoxy per kilogram of polyester.

Another optional component in this embodiment of the composition is a catalyst. Catalysts can be selected from hydroxides, hydrides, amides, carbonates, borates, phosphates, $C_2$-$C_{18}$ enolates, $C_2$-$C_{36}$ dicarboxylates, $C_2$-$C_{36}$ metal carboxylates, Lewis acids, $C_1$-$C_{36}$ tetraalkyl ammonium hydroxides or acetates, $C_1$-$C_{36}$ tetraalkyl phosphonium hydroxides or acetates, alkali or alkaline earth metal salts of a negatively charged polymer, or the like, or a combination comprising at least one of the foregoing catalysts. Specific catalysts include sodium stearate, sodium carbonate, sodium acetate, sodium bicarbonate, sodium benzoate, sodium caproate, potassium oleate, boron compounds, or a mixture comprising at least one of the foregoing catalysts.

Effective amounts of the catalyst are readily determined by one of ordinary skill in the art without undue experimentation, based on the amount and type of polyester, the amount and type of epoxide, and the amount and type of catalyst, using the guidance provided herein. In one embodiment, the catalyst is present in an amount of about 0.001 to about 1 weight percent, specifically in an amount of about 0.003 to about 0.1 weight percent, based on the total weight of the composition.

Polyester compositions comprising the aminoalcohol of formula (III), the aromatic epoxy compound, and an optional catalyst have improved flow properties at high temperatures compared to the same compositions without the aminoalcohol, the aromatic epoxy compound, and an optional catalyst. Spiral flow, which can be measured in an injection molding machine with a spiral mold at a melt temperature of 250° C. to 260° C., a mold temperature of 66° C., a gauge of 1.5 millimeters, and a boost pressure of 10 megapascals, exhibits an improvement of 20 percent or more, specifically an improvement of 25 percent or more, even more specifically an

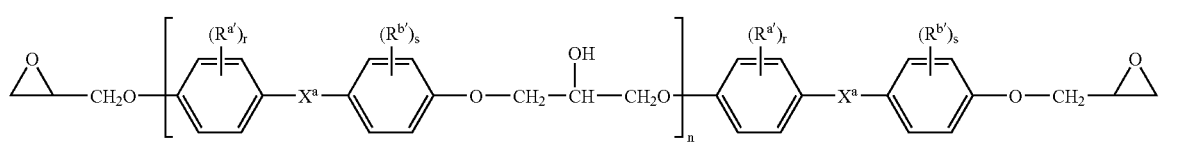

improvement of 30 percent or more, compared to the spiral flow of the same composition without the aminoalcohol, the aromatic epoxy compound, and an optional catalyst.

Similarly, the capillary viscosity of polyester compositions comprising the aminoalcohol of formula (III), the aromatic epoxy compound, and an optional catalyst shows an improvement over polyester compositions without these additives. Capillary viscosity can be measured in accordance with ASTM D3835 or ISO D11433, wherein dried pellets are extruded through a capillary rheometer and the force at varied shear rates is determined. This allows an estimation of shear viscosity. Capillary viscosities of polyester compositions comprising the aminoalcohol, the aromatic epoxy compound, and an optional catalyst show an improvement of 20 percent or more, specifically an improvement of 25 percent or more, even more specifically an improvement of 30 percent or more, compared to the capillary viscosities of the same composition without the aminoalcohol, the aromatic epoxy compound, and an optional catalyst.

Polyester compositions comprising the aminoalcohol, the aromatic epoxy compound, and an optional catalyst can further have improved retention of impact properties after heat aging, compared to polyester compositions without both the aminoalcohol and the aromatic epoxy compound. An article molded from these compositions retains at least 60%, more specifically at least 75%, even more specifically at least 85% of its tensile strength, measured in accordance with ASTM D638, after aging at 90° C. for 168 hours at 95% relative humidity.

In a particularly advantageous embodiment, an improvement in impact properties is observed under conditions of heat, humidity, and pressure similar to those encountered during autoclaving. Accordingly, an article comprising a polyester, the aminoalcohol, the aromatic epoxy compound, and an optional catalyst retains more of a tensile property after aging under conditions of high heat, humidity, and pressure than the same composition without the diepoxide. In particular, an article molded from these compositions more of its tensile stress, after aging at 110° C., at 140 kilopascals, for 120 hours at 100% relative humidity, measured in accordance with ASTM D638.

In a specific embodiment, the foregoing polyester compositions can have both improved flow and improved tensile properties compared to a composition without both of the polyhydric alcohol and the diepoxy compound.

The composition can further comprise an impact modifier. Impact modifiers, as used herein, include materials effective to improve the impact properties of polyesters.

Useful impact modifiers are substantially amorphous copolymer resins, including but not limited to acrylic rubbers, ASA rubbers, diene rubbers, organosiloxane rubbers, EPDM rubbers, SBS or SEBS rubbers, ABS rubbers, MBS rubbers and glycidyl ester impact modifiers.

The acrylic rubber is a preferably core-shell polymer built up from a rubber-like core on which one or more shells have been grafted. Typical core material consists substantially of an acrylate rubber. Preferable the core is an acrylate rubber of derived from a C4 to C12 acrylate. Typically, one or more shells are grafted on the core. Usually these shells are built up for the greater part from a vinyl aromatic compound and/or a vinyl cyanide and/or an alkyl(meth)acrylate and/or (meth) acrylic acid. Preferable the shell is derived from an alkyl (meth)acrylate, more preferable a methyl(meth)acrylate. The core and/or the shell(s) often comprise multi-functional compounds that may act as a cross-linking agent and/or as a grafting agent. These polymers are usually prepared in several stages. The preparation of core-shell polymers and their use as impact modifiers are described in U.S. Pat. Nos. 3,864,428 and 4,264,487. Especially preferred grafted polymers are the core-shell polymers available from Rohm & Haas under the trade name PARALOID®, including, for example, PARALOID® EXL3691 and PARALOID®EXL3330, EXL3300 and EXL2300. Core shell acrylic rubbers can be of various particle sizes. The preferred range is from 300-800 nm, however larger particles, or mixtures of small and large particles, may also be used. In some instances, especially where good appearance is required acrylic rubber with a particle size of 350-450 nm may be preferred. In other applications where higher impact is desired acrylic rubber particle sizes of 450-550 nm or 650-750 nm may be employed.

Acrylic impact modifiers contribute to heat stability and UV resistance as well as impact strength of polymer compositions. Other preferred rubbers useful herein as impact modifiers include graft and/or core shell structures having a rubbery component with a Tg (glass transition temperature) below 0° C., preferably between about −40° to about −80° C., which comprise poly-alkylacrylates or polyolefins grafted with poly(methyl)methacrylate or styrene-acrylonitrile copolymer. Preferably the rubber content is at least about 10% by weight, most preferably, at least about 50%.

In another aspect of the invention the acrylic core shell rubber comprises a multi-phase composite interpolymer comprising about 25 to 95 weight percent of a first acrylic elastomeric phase polymerized from a monomer system comprising about 75 to 99.8% by weight $C_1$ to $C_{14}$ alkyl acrylate, 0.1 to 5% by weight crosslinking member, 0.1 to 5% by weight graftlinking monomer, said crosslinking monomer being a polyethylenically unsaturated monomer having a plurality of addition polymerizable reactive groups and about 75 to 5 weight percent of a final, rigid thermoplastic acrylic or methacrylic phase polymerized in the presence of said elastomer.

Typical other rubbers for use as impact modifiers herein are the butadiene core-shell polymers of the type available from Rohm & Haas under the trade name PARALOID® EXL2600. Most preferably, the impact modifier will comprise a two stage polymer having a butadiene based rubbery core, and a second stage polymerized from methylmethacrylate alone or in combination with styrene. Impact modifiers of the type also include those that comprise acrylonitrile and styrene grafted onto cross-linked butadiene polymer, which are disclosed in U.S. Pat. No. 4,292,233 herein incorporated by reference.

Other suitable impact modifiers may be mixtures comprising core shell impact modifiers made via emulsion polymerization using alkyl acrylate, styrene and butadiene. These include, for example, methylmethacrylate-butadiene-styrene (MBS) and methylmethacrylate-butylacrylate core shell rubbers.

Among the other suitable impact modifiers are the so-called block copolymers and rubbery impact modifiers, for example, A-B-A triblock copolymers and A-B diblock copolymers. The A-B and A-B-A type block copolymer rubber additives which may be used as impact modifiers include thermoplastic rubbers comprised of one or two alkenyl aromatic blocks which are typically styrene blocks and a rubber block, e.g., a butadiene block which may be partially hydrogenated. Mixtures of these triblock copolymers and diblock copolymers are especially useful.

Suitable A-B and A-B-A type block copolymers are disclosed in, for example, U.S. Pat. Nos. 3,078,254; 3,402,159; 3,297,793; 3,265,765; and 3,594,452 and U.K. Pat. No. 1,264,741. Examples of typical species of A-B and A-B-A block copolymers include polystyrene-polybutadiene (SB), polystyrene-poly(ethylene-propylene), polystyrene-polyisoprene, poly(a-methylstyrene)-polybutadiene, polystyrene-polybutadiene-polystyrene (SBS), polystyrene-poly(ethylene-propylene)-polystyrene, polystyrene-polyisoprene-polystyrene and poly(α-methylstyrene)-polybutadiene-poly (α-methylstyrene), as well as the selectively hydrogenated versions thereof, and the like. Mixtures comprising at least one of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the trade name VECTOR, and Kuraray under the trademark SEPTON.

The composition can also comprise a vinyl aromatic-vinyl cyanide copolymer. Suitable vinyl cyanide compounds include acrylonitrile and substituted vinyl cyanides such a methacrylonitrile. Preferably the impact modifier comprises styrene-acrylonitrile copolymer (hereinafter SAN). The preferred SAN composition comprises at least 10, preferably 25 to 28, percent by weight acrylonitrile (AN) with the remainder styrene, para-methyl styrene, or alpha methyl styrene. Another example of SANs useful herein include those modified by grafting SAN to a rubbery substrate such as, for example, 1,4-polybutadiene, to produce a rubber graft polymeric impact modifier. High rubber content (greater than 50% by weight) resin of this type (HRG-ABS) may be especially useful for impact modification of polyester resins and their polycarbonate blends.

Another class of preferred impact modifiers, referred to as high rubber graft ABS modifiers, comprise greater than or equal to about 90% by weight SAN grafted onto polybutadiene, the remainder being free SAN. ABS can have butadiene contents between 12% and 85% by weight and styrene to acrylonitrile ratios between 90:10 and 60:40. Preferred compositions include: about 8% acrylonitrile, 43% butadiene and 49% styrene, and about 7% acrylonitrile, 50% butadiene and 43% styrene, by weight. These materials are commercially available under the trade names BLENDEX 336 and BLENDEX 415 respectively (Crompton Co.).

Improved impact strength is obtained by melt compounding polybutylene terephthalate with ethylene homo- and copolymers functionalized with either acid or ester moieties as taught in U.S. Pat. Nos. 3,405,198; 3,769,260; 4,327,764; and 4,364,280. Polyblends of polybutylene terephthalate with a styrene-alpha-olefin-styrene triblock are taught in U.S. Pat. No. 4,119,607. U.S. Pat. No. 4,172,859 teaches impact modification of polybutylene terephthalate with random ethylene-acrylate copolymers and EPDM rubbers grafted with a monomeric ester or acid functionality.

Preferred impact modifiers include core-shell impact modifiers, such as those having a core of poly(butyl acrylate) and a shell of poly(methyl methacrylate).

Impact modifiers may be present in 0.1 to about 30 weight percent. A useful amount of impact modifier is about 1 to about 30 weight percent, preferably about 5 to about 15 weight percent, more preferably about 6 to about 12 weight percent, wherein the weight percentages are based on the entire weight of the composition.

Normally, inclusion of impact modifiers, which are particulate in nature, increases the melt viscosity of polyester compositions. Enhancing the melt flow of impact modified polyester compositions comprising any of the aforesaid impact modifiers is a need in the industry.

Additionally, it may be desired to employ inorganic fillers in the thermoplastic resin provide higher tensile modulus, density and low coefficient of thermal expansion without deleteriously affecting the other favorable properties.

Incorporation of inorganic fillers often leads to increase of viscosity of polymer compositions. Enhancement of flow of such compositions is highly desirable.

Typical inorganic fillers include: alumina, amorphous silica, anhydrous alumino silicates, mica, wollastonite, barium sulfate, zinc sulfide, clays, talc, metal oxides such as titanium dioxide. Low levels (0.1-10.0 wt. %) of very small particle size (largest particles less than 10 microns in diameter) are preferred.

The polyester resins of the invention may be further blended with reinforcements, fillers and colorants.

Reinforcing fiber and fillers may comprise from about 5 to about 50 weight percent of the composition, preferably from about 10 to about 35 weight percent based on the total weight of the composition. The preferred reinforcing fibers are glass, ceramic and carbon and are generally well known in the art, as are their methods of manufacture. In one embodiment, glass is preferred, especially glass that is relatively soda free. Fibrous glass filaments comprised of lime-alumino-borosilicate glass, which is also known as "E" glass are often especially preferred. Glass fiber is added to the composition to greatly increase the flexural modulus and strength, albeit making the product more brittle. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns are required with a diameter of from 10-15 microns being preferred. In preparing the molding compositions it is convenient to use the fiber in the form of chopped strands of from about ⅛" (3 mm) to about ½" (13 mm) long although roving may also be used. In articles molded from the compositions, the fiber length is typically shorter presumably due to fiber fragmentation during compounding of the composition. The length of such short glass fibers present in final molded compositions is less than about 4 mm. The fibers may be treated with a variety of coupling agents to improve adhesion to the resin matrix. Preferred coupling agents include; amino, epoxy, amide or mercapto functionalized silanes. Organometallic coupling agents, for example, titanium or zirconium based organometallic compounds, may also be used.

Other preferred sizing-coated glass fibers are commercially available from Owens Corning Fiberglass as, for example, OCF K filament glass fiber 183F.

In another embodiment, long glass fibers can be used, wherein a continuous glass fiber bundle containing thousands of glass fiber monofilaments having a diameter in the range, 10-24 µm, preferably 13-18 µm is impregnated with a melted thermoplastic preferably a polyester. After cooling, the impregnated bundle is cut into pellets having a length of >5 mm, preferably, above >9 mm, as prepared by the application of a process known as the pullout or pultrusion process. For impregnation, a high flow polyester of the present invention can be used in order to improve the wetting rate of the filaments to make long glass fiber pellets. These pellets can be incorporated into the polyester compositions of the invention, to get long fiber glass reinforced polyester compositions. The length of long glass fiber present in molded composition prepared by this method is typically greater than that prepared by incorporation of short fibers and predominant portion of the long glass fibers present have a length >4 mm in the molded part. Such long fiber glass reinforced compositions can be used for different molding techniques such as injection molding, compression molding, thermoforming and the like.

As in the case of short fibers, the long fibers may also be treated with a variety of coupling agents to improve adhesion to resin. For those skilled in the art, a continuous process such as pushtrusion technique for direct incorporation of long glass fibers in high flow polyester compositions will also be possible.

Other fillers and reinforcing agents may be used alone or in combination with reinforcing fibers. These include but are not limited to: carbon fibrils, mica, talc, barites, calcium carbonate, wollastonite, milled glass, flaked glass, ground quartz, silica, zeolites, and solid or hollow glass beads or spheres, clay, fibrillated tetrafluoroethylene, polyester fibers or aramid fibers.

The glass fibers may be blended first with the aromatic polyester and then fed to an extruder and the extrudate cut into pellets, or, in a preferred embodiment, they may be separately fed to the feed hopper of an extruder. In a highly preferred embodiment, the glass fibers may be fed downstream in the extruder to minimize attrition of the glass. Generally, for preparing pellets of the composition set forth herein, the extruder is maintained at a temperature of approximately 480° F. to 550° F. The pellets so prepared when cutting the extrudate may be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

The composition of the present invention may include additional components that do not interfere with the previously mentioned desirable properties but enhance other favorable properties such as bis epoxy chain extenders, chain extension catalysts, monoepoxy chain terminators, heat stabilizers, antioxidants, colorants, including dyes and pigments, lubricants, mold release materials, nucleating agents or ultra violet (UV) stabilizers. Examples of lubricants are alkyl esters, for example pentaerythritol tetrastearate (PETS), alkyl amides, such as ethylene bis-stearamide, and polyolefins, such as polyethylene.

In a specific embodiment, the composition includes a flame retarding component. The flame retarding component can be added to the composition to suppress, reduce, delay or modify the propagation of a flame through a composition or an article based on the composition. Specific exemplary flame retarding components include halogenated hydrocarbons (chlorine- and bromine-containing compounds and reactive flame retardants), inorganic flame retardants (boron compounds, antimony oxides, aluminum hydroxide, molybdenum compounds, zinc and magnesium oxides), phosphorous containing compounds (organic phosphates, phosphinates, phosphites, phosphonates, phosphines, halogenated phosphorus compounds and inorganic phosphorus-containing salts) and nitrogen containing compounds such as melamine cyanurate. Combinations comprising one or more of the foregoing types of flame retardant components can be used.

Specific inorganic flame retardants include metal hydroxides, antimony compounds, boron compounds, other metal compounds, phosphorous compounds, and other inorganic flame retarding compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octamolybdate (AOM), zirconium compounds, titanium compounds, zinc compounds such as zinc stannate, zinc hydroxy-stannate, as well as others, and combinations comprising at least one of the foregoing inorganic flame retardants.

Specific examples of suitable halogenated organic flame retardants tetrabromobisphenol A, octabromobiphenyl ether, decabromodiphenyl ether, bis(tribromophenoxy) ethane, tetrabromobiphenyl ether, hexabromocyclododecane, tribromophenol, bis(tribromophenoxy) ethane, tetrabromobisphenol A polycarbonate oligomers, and tetrabromobisphenol A epoxy oligomers. Typically halogenated aromatic flame retardants include tetrabromobisphenol A polycarbonate oligomer, which, if desired, are endcapped with phenoxy radicals, or with brominated phenoxy radicals, polybromophenyl ether, brominated polystyrene, brominated BPA polyepoxide, brominated imides, brominated polycarbonate, poly(haloaryl acrylate), poly(haloaryl methacrylate), e.g., poly(pentabromobenzyl)acrylate, or a combination comprising at least one of the foregoing. Also included within the class of halogenated flame retardants are brominated polystyrenes such as poly-dibromostyrene and polytribromostyrene, decabromobiphenyl ethane, tetrabromobiphenyl, brominated alpha,omega-alkylene-bis-phthalimides, e.g., N,N'-ethylene-bis-tetrabromophthalimide, oligomeric brominated carbonates, especially carbonates derived from tetrabromobisphenol A, and brominated epoxy resins.

Chlorinated flame retardants include chlorinated paraffins, and bis (hexachlorocyclopentadieno)cyclooctane, as well other such functionally equivalent materials.

Examples of suitable phosphorous-containing flame retardants include red phosphorus and ammonium polyphosphate, as well as organophoshorus flame retardants, e.g., halogenated phosphates and other non-halogenated compounds. Examples of such materials include tris(1-chloro-2-propyl) phosphate, tris(2-chloroethyl)phosphate, tris(2,3-dibromopropyl)phosphate, phosphate esters, trialkyl phosphates, triaryl phosphates, aryl-alkyl phosphates, and combinations thereof. Other flame retardants can include polyols, phosphonium derivatives, phosphonates, phosphanes, and phosphines.

Specific phosphorous-containing compounds include phosphates of the formula:

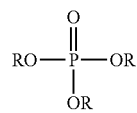

wherein each R is independently a $C_{1-18}$ alkyl, cycloalkyl, aryl, or arylalkyl, e.g., cyclohexyl, isopropyl, isobutyl, and the like; phosponates of the formula:

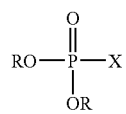

wherein X is H, and each R is independently a $C_{1-18}$ alkyl, cycloalkyl, aryl, or arylalkyl, e.g., cyclohexyl, isopropyl, isobutyl, and the like; phosphinates of the formula

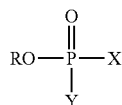

wherein X and Y is H, and R is a $C_{1-18}$ alkyl, cycloalkyl, aryl, or arylalkyl, e.g., cyclohexyl, isopropyl, isobutyl, and the like; phosphine oxides of the formula:

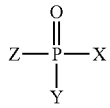

wherein X, Y, and Z are H and R, is a $C_{1-18}$ alkyl, cycloalkyl, aryl, arylalkyl, e.g., cyclohexyl, isopropyl, isobutyl, and the like; phosphines of the formula:

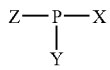

wherein X, Y, and Z is each independently a H, $C_{1-18}$ alkyl, cycloalkyl, aryl, arylalkyl, and the like; or a phosphite of the formula:

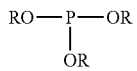

wherein each R is independently the same or different can be selected from the group of $C_{1-18}$ alkyl, cycloalkyl, aryl, or arylalkyl, e.g., cyclohexyl, isopropyl, isobutyl, and the like, and H.

As such, suitable flame retarding agents that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl) p-tolyl phosphate, tritolyl phosphate, bis(2-ethylhexyl)phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like. Di- or polyfunctional aromatic phosphorus-containing compounds are also useful, for example, compounds of the formulas below:

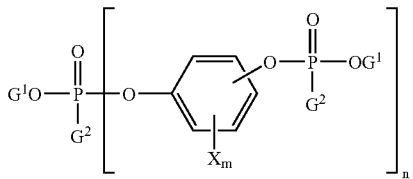

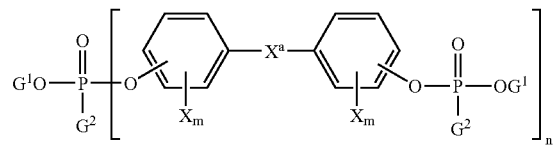

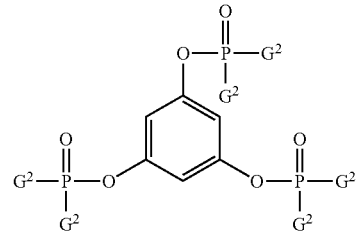

wherein each $G^1$ is independently a hydrocarbon having 1 to about 30 carbon atoms; each $G^2$ is independently a hydrocarbon or hydrocarbonoxy having 1 to about 30 carbon atoms; each $X_m$ is independently a bromine or chlorine; m is 0 to 4; and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Other exemplary suitable flame retarding compounds containing phosphorus-nitrogen bonds, include phosphonitrilic chloride, phosphorus ester amides, phosphoric acid amides, phosphonic acid amides, phosphinic acid amides, and tris (aziridinyl)phosphine oxide. When present, phosphorus-containing flame retardants are generally present in amounts of about 1 to about 20 parts by weight, based on 100 parts by weight of the total resin in the final composition.

In one embodiment, the flame retarding polyester composition includes a flame retarding quantity of one or a mixture of nitrogen-containing flame retardants such as triazines, guanidines, cyanurates, and isocyanurates. Suitable triazines have the formula

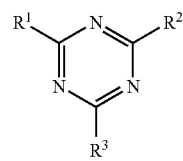

wherein $R^1$, $R^2$, and $R^3$ are independently $C_{1-12}$ alkyl, $C_{1-12}$ alkoxyl, $C_{6-12}$ aryl, amino, $C_{1-12}$ alkyl-substituted amino, or hydrogen. Highly suitable triazines include 2,4,6-triamine-1, 3,5-triazine (melamine, CAS Reg. No. 108-78-1), melamine derivatives, melam, melem, melon, ammeline (CAS Reg. No.

645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid may be used in the composition. Examples include melamine pyrophosphate and melamine polyphosphate. Suitable cyanurate/isocyanurate compounds include salts/adducts of the triazine compounds with cyanuric acid, such as melamine cyanurate and any mixtures of melamine salts.

Suitable guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame retardants are often used in combination with one or more phosphorous-based compounds, for example the phosphinates and diphosphinates set forth in U.S. Pat. No. 6,255,371 to Schosser et al. Specific phosphinates include aluminum diethylphosphinate (DEPAL), and zinc diethylphosphinate (DEPZN). The phosphinates have the formula (1)

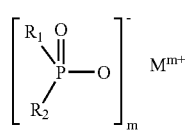

and/or formula (2),

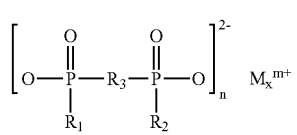

and or polymers comprising units derived from formulas (1) or (2), wherein $R_1$ and $R_2$ are the same or different, and are H, $C_{1-6}$ alkyl (linear or branched), and/or aryl; $R_3$ is $C_{1-10}$ alkylene, (linear or branched), $C_{6-10}$ arylene, $C_{6-10}$ alkylarylene or $C_{6-10}$ arylalkylene; M is any metal, e.g., magnesium, calcium, aluminum or zinc, m is 1, 2 or 3; n is 1, 2 or 3; and x is 1 or 2. In one embodiment, $R_1$ and $R_2$ can be H. This results in a hypophosphite, a subset of phosphinate, such as calcium hypophosphite, aluminum hypophosphite, and the like.

The flame retardants are typically used with a synergist, particularly inorganic antimony compounds. Such compounds are widely available or can be made in known ways. Typical inorganic synergist compounds include $Sb_2O_5$, $SbS_3$, sodium antimonate and the like. Especially suitable is antimony trioxide ($Sb_2O_3$). Synergists such as antimony oxides are typically used in an amount of about 0.5 to 15 by weight, based on the weight of resin in the final composition.

Also, the present composition may contain polytetrafluoroethylene (PTFE) type resins or copolymers, which are used either to reduce dripping in flame retardant thermoplastics or to form fibrillar network in the composition. In one embodiment the fluoropolymer is at least partially encapsulated by an encapsulating thermoplastic polymer, for example PTFE/SAN, synthesized by aqueous emulsion polymerization as disclosed in U.S. Pat. No. 5,804,654.

Flame retardant additives are desirably present in an amount at least sufficient to reduce the flammability of the polyester resin, preferably to a UL94 V-0 rating. The amount will vary with the nature of the resin and with the efficiency of the additive. The amount of the flame retarding component is generally at least 1 wt. %, based on the weight of resin in the final composition. In one embodiment, the amount of the flame retarding component is from 5 wt. % to 30 wt %, based on the weight of resin in the final composition. In another embodiment, the amount of the flame retarding component is from 10 to 20 wt. %, based on the weight of resin in the final composition.

The polycarbonate used in this composition is derived from bisphenol A and phosgene. In an alternative embodiment, the polycarbonate resin is a blend of two or more polycarbonate resins.

The aromatic polycarbonate may be prepared in the melt, in solution, or by interfacial polymerization techniques well known in the art. For example, the aromatic polycarbonates can be made by reacting bisphenol-A with phosgene, dibutyl carbonate or diphenyl carbonate. Such aromatic polycarbonates are also commercially available. In one embodiment, the aromatic polycarbonate resins are commercially available from General Electric Company, e.g., LEXAN™ bisphenol A-type polycarbonate resins. One aromatic polycarbonate is a homopolymer, e.g., a homopolymer derived from 2,2-bis (4-hydroxyphenyl)propane (bisphenol-A) and phosgene, commercially available under the trade designation LEXAN Registered TM from General Electric Company.

Branched polycarbonates are prepared by adding a branching agent during polymerization. These branching agents are well known and may comprise polyfunctional organic compounds containing at least three functional groups, which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)-isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid and benzophenone tetracarboxylic acid. The branching agent may be added at a level of about 0.05-2.0 weight percent. Branching agents and procedures for making branched polycarbonates are described in U.S. Letters Pat. Nos. 3,635,895; 4,001,184; and 4,204,047.

The preferred polycarbonates are preferably high molecular weight aromatic carbonate polymers have an intrinsic viscosity (as measured in methylene chloride at 25° C.) ranging from about 0.30 to about 1.00 deciliters per gram. Polycarbonates may be branched or unbranched and generally will have a weight average molecular weight of from about 10,000 to about 200,000, preferably from about 20,000 to about 100,000 as measured by gel permeation chromatography. It is contemplated that the polycarbonate may have various known end groups.

The level of polycarbonate employed in the composition of the present invention ranges from 5 to 90% of the total weight of the composition, more preferably, from 20 to 70% of the total weight of the composition.

Other thermoplastic polymers such as polyamides, polyolefins, polyphenylene ether, polyphenylene sulfide, polyetherimides, organosiloxane rubber, ethylene propylene diene monomer rubber, styrene-butadiene-styrene rubber, styrene-ethylene-butadiene-styrene rubber, acrylonitrile-butadiene-styrene rubber, methacrylate-butadiene-styrene rubber, styrene acrylonitrile copolymer, glycidyl esters, or other polycarbonates can be present in the composition in place of polycarbonate, as property modifying polymers.

The polyester composition of the invention may be formed by techniques known in the art. The ingredients are typically in powder or granular form, and extruded as a blend, and/or comminuting into pellets or other suitable shapes. The ingredients may be combined in any manner, e.g., by dry mixing or by mixing in the melted state in an extruder, or in other mixers. For example, one embodiment comprises melt blending the ingredients in powder or granular form, extruding the blend and comminuting into pellets or other suitable shapes. Also included is dry mixing the ingredients, followed by mixing in the melted state in an extruder.

The blends of the invention may be formed into shaped articles by a variety of common processes for shaping molten polymers such as injection molding, compression molding, extrusion, blow molding and gas assist injection molding. Examples of such articles include electrical connectors, enclosures for electrical equipment, automotive engine parts, lighting sockets and reflectors, electric motor parts, power distribution equipment, communication equipment and the like including devices that have molded in snap fit connectors. The modified polyester resins can also be made into films and sheets.

EXAMPLES

The following examples illustrate the present invention, but are not meant to be limitations to the scope thereof. Examples of the invention are designated by En and comparative examples are shown by Cn where n stands for the number of the example. The examples were all prepared and tested in a similar manner.

The ingredients of the examples were tumble blended and then extruded on a on a Twin Screw Extruder with a vacuum vented mixing screw, at a barrel and die head temperature between 240 and 265° C. The screw speed was at 300 rpm. The extrudate was cooled through a water bath prior to pelletizing. Test parts were injection molded on an Engel 110T molding machine or a van Dorn molding machine with a set temperature of approximately 240 to 265° C. The pellets were dried for 2-4 hours at 120° C. in a forced air-circulating oven prior to injection molding.

Flow measurement: In this work, three measurement methods were used. The flow of different examples was characterized normally by one or more of these methods given in the following paragraphs.

Melt Volume Rate (MVR) on pellets (dried for 2 hours at 120° C. prior to measurement) was measured according to ISO 1133 method at dwelling time of 240 seconds and 0.0825 inch (2.1 mm) orifice.

Spiral flow was measured in injection molding machine with a spiral mold. The flow length (in cm) in the mold was measured under the given test conditions. Melt Temperature, mold temperature, gauge of spiral flow, and boost pressure were 260° C., 66° C., 1.5 mm, and 10 Mpa, respectively. The first 10-15 parts were thrown away until constant flow length has been reached. The reported values were average of 5 parts.

Capillary viscosity, which is another indicator of melt-flow, was measured by ASTM D3835 or ISO D11433. Dried pellets were extruded through a capillary Rheometer and the force at varied shear rates was determined to estimate the shear viscosity.

Tensile properties were tested according to ISO 527 on 150×10×4×mm (length×width×thickness) injection molded bars at 23° C. with a crosshead speed of 5 mm/min. Izod unnotched impact was measured at 23° C. with a pendulum of 5.5 Joule on 80×10×4 mm (length×width×thickness) impact bars according to ISO 180 method. Flexural properties or three point bending were measured at 23° C. on 80×10×4 mm (length×width×thickness) impact bars with a crosshead speed of 2 mm/min according to ISO 178.

In other cases, injection molded parts were tested by ASTM. Notched Izod testing as done on 3×½×⅛ inch bars using ASTM method D256. Tensile elongation at break was tested on 7×⅛ in. injection molded bars at room temperature with a crosshead speed of 2 in./min for glass filled samples and 0.2 in/min for un-filled samples by using ASTM D648. Flexural properties were measured using ASTM 790 or ISO 178 method. Biaxial impact testing, sometimes referred to as instrumented impact testing, was done as per ASTM D3763 using a 4×⅛ inch molded discs. The total energy absorbed by the sample is reported as ft-lbs or J.

Oven aging was done by placing molded parts in an air circulating oven at 155° C. Parts were removed from the oven, allowed to cool and equilibrate at 50% relative humidity for at least two days before testing. Oven aging was done as per ASTM D3045.

Flame retardancy tests were performed following the procedure of Underwriter's Laboratory Bulletin 94 entitled "Tests for Flammability of Plastic Materials, UL94." According to this procedure, materials may be classified as HB, V0, V1, V2, VA and/or VB on the basis of the test results obtained for five samples. To achieve a rating of V0, in a sample placed so that its long axis is 180 degrees to the flame, the average period of flaming and/or smoldering after removing the igniting flame does not exceed five seconds and none of the vertically placed samples produces drips of burning particles that ignite absorbent cotton. Five bar flame out time (FOT) is the sum of the flame out time for five bars, each lit twice for a maximum flame out time of 50 seconds. To achieve a rating of V1, in a sample placed so that its long axis is 180 degrees to the flame, the average period of flaming and/or smoldering after removing the igniting flame does not exceed twenty-five seconds and none of the vertically placed samples produces drips of burning particles that ignite absorbent cotton. Five bar flame out time is the sum of the flame out time for five bars, each lit twice for a maximum flame out time of 250 seconds. Compositions of this invention are expected to achieve a UL94 rating of V1 and/or V0 at a thickness of preferably 1.5 mm or lower.

In the following tables, the comparative examples are designated by C followed by a number and the examples of the invention are designated by E followed by a number.

The components used in the examples are given in Table 1.

TABLE 1

Test Materials

| Abbreviation | Material |
| --- | --- |
| PBT195 | Poly(1,4-butylene terephthalate) from General Electric Company intrinsic viscosity of 0.7 cm3/g as measured in a 60:40 phenol/tetrachloroethane mixture. |
| PBT315 | Poly(1,4-butylene terephthalate) from General Electric Company intrinsic viscosity of 1.2 cm3/g as measured in a 60:40 phenol/tetrachloroethane mixture. |

TABLE 1-continued

Test Materials

| Abbreviation | Material |
|---|---|
| PC100 | PC bisphenol polycarbonate Lexan ® resin from General Electric Company. Mn by GPC against polystyrene standards is 29 Kg/mol. |
| Pentaerythritol | Tetrakis(hydroxymethyl)methane; 2,2-Bis-(hydroxymethyl)-1,3-propanediol |
| THAM | Trishydroxymethyl aminomethane as purchased from Aldrich Chemical Company, USA. |
| AO1010 | Hindered Phenol, Pentaerythritol tetrakis(3,5-di-tert-butyl-4-hydroxyhydrocinnamate) sold as IRAGANOX 1010 from Ciba Geigy |
| Glass fiber | E glass with diameter of 10 or 13 um. Sizing-coated glass fibers are commercially available from Owens Corning Fiberglass as, for example, OCF K filament glass fiber 183F. |
| PEP-Q | Tetrakis(2,4-di-tert-butylphenyl)4,4'-biphenylene diphosphonite SANDOSTAB PEPQ from Clariant Chemicals. |
| PETS | pentaerythritol tetrastearate |
| S2001 | Core-shell type impact modifier with silicone-acrylic-based rubber, METABLEN S-2001 from Mitsubishi Rayon. |
| ABS | Acrylonitrile-Butadiene-Styrene copolymer impact modifier, Sold as VHRG or HRG SG24 or HRG360 from General Electric |
| MBS | Methacrylate-Butadiene-Styrene emulsion copolymer impact modifier with core-shell structure, sold as EXL2691 or EXL2650A from Rohm & Haas. |
| Acrylic impact modifier | Acrylic impact modifier from Rohm and Haas EXL3330 Emulsion copolymer of methacrylate-butyl acrylate with core-shell structure. |
| EPON1001F | [chemical structure shown] from Hexion Specialty Chemical, with an epoxy equivalent molecular weight of 525 to 550. |
| Sodium stearate | Catalyst |
| Lotader AX8900 | Polyethylene/poly(methyl acrylate) copolymer comprising 67 wt % ethylene, 25 wt % methyl acrylate, and 8 wt % reactive glycidyl methacrylate groups, sold by Arkema Inc. |
| Hytrel 4056 | Poly(butylene terephthalate)/poly(tetrahydrofuran) copolymer comprising 48 wt % poly(tetrahydrofuran) |
| AO168 | 2,4-di-tert-butylphenol phosphite, sold as IRGAPHOS 168 from Ciba Geigy |

TABLE 2

| | Unit | C1 | C2 | E1 | E2 | E3 | E4 | E5 |
|---|---|---|---|---|---|---|---|---|
| Component | | | | | | | | |
| PBT315 | % | 100 | 99.5 | 99.9 | 99.8 | 99.7 | 99.5 | 99.0 |
| THAM | % | 0.0 | 0.0 | 0.1 | 0.2 | 0.3 | 0.5 | 1.0 |
| Pentaerythritol | % | 0.0 | 0.5 | — | — | — | — | — |
| Properties | | | | | | | | |
| Spiral flow | cm | 27 | 42 | 29 | 33 | 38 | 55 | 90 |
| Melt volume rate (MVR) at 265° C./2.16 Kg/240 s | cc/10 min | 5.6 | 17.5 | 7.5 | 9.9 | 11.5 | 37.0 | 67.0 |
| Tensile Modulus | GPa | 2.6 | 2.75 | 2.6 | 2.58 | 2.65 | 2.83 | 2.88 |
| Elongation % | % | 51 | 21 | 36.1 | 33.4 | 31.2 | 14.7 | 3.2 |
| Izod Unnotched at 23° C. | kJ/m2 | 210 | 170 | 186 | 180 | 176 | 128 | 43 |

As seen in Table 2 (examples E1 to E5), the variation of the levels of THAM has a profound effect on the melt volume rate or spiral flow, both being independent measures of melt flowability of polymer composition. When the amount of THAM is greater than about 1% by weight of polyester composition, mechanical properties, particularly impact property (Izod Unnotched) gets affected unacceptably.

As seen in Table 3, in a glass filled polyester formulation (example E6), THAM is more efficient in bringing about melt viscosity reduction or improvement in flow than pentaerythritol. THAM is effective in increasing the MVR as seen for example E7 relative to example C7, both containing ABS as the impact modifier. THAM is more efficient than pentaerythritol in enhancing the flow with satisfactory retention in mechanical properties.

TABLE 3

| | Unit | C5 | C6 | E6 | C7 | C8 | E7 |
|---|---|---|---|---|---|---|---|
| Component | | | | | | | |
| PBT-315 | % | 75 | 74.75 | 74.75 | 65 | 64.75 | 64.75 |
| Glass | % | 25 | 25 | 25 | 25 | 25 | 25 |
| Pentaerythritol | % | | 0.25 | | | 0.25 | |
| THAM | % | | | 0.25 | | | 0.25 |

TABLE 3-continued

|  | Unit | C5 | C6 | E6 | C7 | C8 | E7 |
|---|---|---|---|---|---|---|---|
| ABS HRG360 | % |  |  |  | 10 | 10 | 10 |
| AO 1010 | % | 0.8 | 0.8 | 0.8 | 0.8 | 0.8 | 0.8 |
| Properties |  |  |  |  |  |  |  |
| Melt volume rate (MVR) at 265° C./2.16 Kg/240 s | cc/10 min | 5.2 | 12.7 | 18 | 2.2 | 6.1 | 7.9 |
| Spiral flow | cm | 53 | 77 | 91 | 49 | 75 | 89 |
| Tensile Modulus | GPa | 5.91 | 6.19 | 6.3 | 6.19 | 5.71 | 5.71 |
| Tensile Strength | GPa | 94 | 94 | 94.4 | 82 | 79 | 79 |
| Elongation % | % | 5.4 | 4.4 | 4.3 | 4.9 | 4.3 | 4.3 |
| Flexural Modulus | GPa | 5.52 | 5.81 | 5.85 | 5.34 | 5.15 | 5.27 |
| Flexural Strength | GPa | 149.8 | 150.7 | 153 | 128.7 | 125.5 | 126.5 |
| HDT | ° C. | 148 | 157 | 165 | 154 | 150 | 155 |
| Izod Unnotched (kJ/m2), 23° C. | kJ/m2 | 49 | 34 | 28 | 45 | 40 | 40 |

In Table 4, flow improvement due to the addition of THAM to a polycarbonate-polyester composition (Example E8) with retention of mechanical properties is demonstrated. For those skilled in the art, the use of THAM and other polyhydric additives of this invention for flow promotion will be possible in analogous types of polycarbonate-polyester or copolyester blends including transparent compositions.

TABLE 4

|  | Unit | C9 | E8 |
|---|---|---|---|
| Component |  |  |  |
| PC100 | % | 75 | 74.75 |
| PBT-315 | % | 25 | 25 |
| THAM | % |  | 0.25 |
| Properties |  |  |  |
| Melt volume rate (MVR) at 265° C./2.16 Kg/240 s | cc/10 min. | 6 | 28 |
| Spiral Flow | Cm | 34 | 63 |
| Tensile Modulus | GPa | 2.41 | 2.61 |
| Elongation | % | 79 | 75 |
| Izod Unnotched 23° C. | kJ/m2 | 250 | 255 |

TABLE 5

|  | Unit | C10 | C11 | C12 | E9 | E10 |
|---|---|---|---|---|---|---|
| Component |  |  |  |  |  |  |
| PBT-195 | % | 69.7 | 59.7 | 59.2 | 59.2 | 59.2 |
| Pentaerythritol | % |  |  | 0.5 | 0.5 | 0.5 |
| Acrylic Impact modifier; Paraloid EXL 3300 | % |  | 10 |  | 10 |  |
| MBS Paraloid EXL2650A | % |  |  |  |  | 10 |
| Metablen S2001 silicone impact modifier | % |  |  |  |  |  |
| ABS HRG SG24 | % |  |  | 10 |  |  |
| Glass; Standard Crystalline glass | % | 30 | 30 | 30 | 30 | 30 |
| Additives | % | 0.3 | 0.3 | 0.3 | 0.3 | 0.3 |
| Properties |  |  |  |  |  |  |
| Melt volume rate (MVR) at 265° C./2.16 Kg/240 s | cc/10 min. | 30 | 7 | 21 | 31 | 32.5 |
| Capillary Shear viscosity at 280° C. (1500/s) | Pa-s | 84 | 91 | 46 | 42 | 53 |
| Izod Unnotched (kJ/m2) | kJ/m2 | 40 | 54 | 42 | 46 | 44 |
| Heat aged Izod Unnotched (155° C. 1 week) | kJ/m2 | 30 | 50 | 22 | 47 | 22 |
| Tensile Strength (Mpa) | Mpa | 146 | 121 | 116 | 120 | 116 |
| Heat aged Tensile Strength (155° C. 1 week) | Mpa | 157 | 133 | 119 | 118 | 110 |
| Tensile Modulus (Mpa) | Mpa | 9350 | 8580 | 8600 | 8590 | 8750 |
| Flexural Strength (Mpa) | Mpa | 217 | 191 | 172 | 182 | 175 |
| Flexural Modulus (Mpa) | Mpa | 8450 | 7700 | 7700 | 7800 | 7900 |

As seen in Table 5, a flow-enhancing agent such as pentaerythritol is highly effective in increasing the flow of a composition comprising acrylic modifier or MBS (Example E9 and E10). Acrylic impact modifier is the most effective among the impact modifiers studied, in bringing about simultaneous improvements in flow and heat ageing stability. Compositions containing either MBS (example, E10) or acrylic impact modifier (example, E9) are superior to comparative example C12 in obtaining superior balance of flow and heat-ageing stability.

TABLE 6

|  | Unit | C13 | E11 | E12 | C14 | E13 | E14 |
|---|---|---|---|---|---|---|---|
| Component |  |  |  |  |  |  |  |
| PBT 195 | % | 49.2 | 48.7 | 48.7 | 49.3 | 48.8 | 48.8 |
| Pentaerythritol | % |  | 0.5 | 0.5 |  | 0.5 | 0.5 |
| Acrylic Impact modifier; Paraloid EXL 3300 | % | 5 | 5 |  | 5 | 5 |  |
| MBS |  | — | — | 5 | — | — | 5 |
| Brominated PC Oligomer, 52% Br | % | 10 | 10 | 10 |  |  |  |
| Brominated Acrylate Poly(pentabromobenzylacrylate) | % |  |  |  | 10.5 | 10.5 | 10.5 |
| $Sb_2O_3$ Masterbatch; 80% in PBT 195 | % | 4 | 4 | 4 | 4.2 | 4.2 | 4.2 |
| Encapsulated PTFE | % | 0.9 | 0.9 | 0.9 | 0.7 | 0.7 | 0.7 |
| Zinc Phosphate | % | 0.6 | 0.6 | 0.6 |  |  |  |
| Glass | % | 30 | 30 | 30 | 30 | 30 | 30 |
| Additives | % | 0.3 | 0.3 | 0.3 | 0.3 | 0.3 | 0.3 |
| Properties |  |  |  |  |  |  |  |
| Melt Volume Rate (250° C., 2.16 Kg, 240 s) | cc/min | 4 | 12 | 8 | 6 | 15 | 9 |
| Izod Unnotched | kJ/m2 | 39 | 34 | 26 | 42 | 38 | 32 |
| Izod Unnotched on heat-aging at 155° C. for 1 week | kJ/m2 | 29 | 26 | 23 | 34 | 26 | 25 |
| Izod Unnotched on heat-aging at 155° C. for 2 weeks | $kJ/m^2$ | 34 | 35 | 25 | 37 | 28 | 21 |
| Tensile Strength (Mpa) | Mpa | 122 | 116 | 114 | 124 | 122 | 118 |
| Tensile Modulus (Mpa) | Mpa | 10165 | 10415 | 10489 | 10350 | 10355 | 10307 |
| Tensile Elongation | % | 2.2 | 1.6 | 1.6 | 1.8 | 2.1 | 2.0 |
| Flexural Strength (Mpa) | Mpa | 185 | 176 | 170 | 188 | 178 | 170 |
| Flexural Modulus (Mpa) | Mpa | 8450 | 8500 | 8700 | 8900 | 8600 | 8600 |
| UL Flame rating 1.5 mm |  | V0 | V0 | V0 | V0 | V0 | V0 |

As seen in Table 6, a flame retardant PBT composition containing pentaerythritol as the flow-enhancing ingredient shows superior flow properties. Also, a composition containing pentaerythritol and an acrylic impact modifier (Examples E11 or E13) provides a superior combination of flow improvement and heat-ageing stability properties than that containing MBS as the impact modifier (examples E12 or E14). Acrylic impact modifier-based compositions provide not only improved flow properties but also good impact resistance and heat-ageing resistance characteristics. The use of pentaerythritol as the flow enhancing additive does not affect the flame retardant rating for the molded bars of 1.5 mm thickness, as seen for comparative examples C13 and C14 as well as the inventive examples E11, E12, E13 and E14.

TABLE 7

|  | Unit | C15 | C16 | E15 | E16 |
|---|---|---|---|---|---|
| Component |  |  |  |  |  |
| PBT 195 | % | 27.1 | 24.6 | 26.975 | 24.475 |
| PBT315 | % | 27.1 | 24.6 | 26.975 | 24.475 |
| THAM | % |  |  | 0.25 | 0.25 |
| Acrylic Impact modifier; Paraloid EXL 3300 | % |  | 5 |  | 5 |
| Brominated PC oligomer 52% Br | % | 10 | 10 | 10 | 10 |
| $Sb_2O_3$ Masterbatch; 80% in PBT 195 | % | 4 | 4 | 4 | 4 |
| Encapsulated PTFE | % | 0.9 | 0.9 | 0.9 | 0.9 |
| Zinc Phosphate | % | 0.6 | 0.6 | 0.6 | 0.6 |
| Glass | % | 30 | 30 | 30 | 30 |
| PETS | % | 0.2 | 0.2 | 0.2 | 0.2 |
| AO1010 | % | 0.1 | 0.1 | 0.1 | 0.1 |
| Properties |  |  |  |  |  |
| Spiral Flow | cm | 52 | 42.5 | 64 | 63.5 |
| Capillary Shear viscosity at 250° C. (1500/s) | pa-s | 233 | 231 | 151 | 143 |
| Izod Unnotched (Initial) | kJ/m2 | 49.08 | 51.20 | 37.88 | 44.79 |
| Izod Unnotched (After Heat aging at 155° C. for 1 week) | kJ/m2 | 36.08 | 42.50 | 18.63 | 27.13 |
| UL-94 (1.5 mm) |  | V0 | V0 | V0 | V0 |

Table 7 illustrates that THAM which contains one primary amino group can be used as a flow enhancing additive in flame retardant polyester formulations as well.

Comparative Examples 17-21 and Example 17 (Table 8) illustrate the improvement in both melt flow and hydrolytic resistance of polyester compositions comprising an aromatic epoxy compound and an aminoalcohol. All component amounts are reported in weight percent. For these examples, the components were processed as above, except that the screw speed of the extruder was 100 rpm, and test articles were molded on a van Dom molding machine with a set temperature of approximately 250° C., and the pellets were dried for 3-4 hours at 120° C. in a forced air-circulating oven prior to injection molding.

Flow properties were measured as described above. Tensile properties were tested on Type I tensile bars at room temperature with a crosshead speed of 2 in./min. according to ASTM D638.

Notched Izod testing was performed on 3×½×⅛ inch (76× 13×3 mm) bars according to ASTM D256 at 23° C.

Unnotched Izod testing was done on 3×½×⅛ inch (76× 13×3 mm) bars according to ASTM D4812 at 23° C.

The flexural bars were tested for flexural properties as per ASTM 790.

The retention of tensile stress at yield was calculated by dividing the tensile stress after heat aging at 90° C. and 95% relative humidity for the indicated number of days, by the tensile stress of the test sample prior to heat aging, and then multiplying by 100.

TABLE 8

| Component | C17 | E17 | C18 | E18 |
|---|---|---|---|---|
| PBT195 | 61.25 | 61.50 | 66.25 | 66.50 |
| Acrylic impact modifier | 5.00 | 5.00 | 0 | 0 |
| Glass fiber | 30.00 | 30.00 | 30.00 | 30.00 |
| EPON1001F | 3.00 | 3.00 | 3.00 | 3.00 |
| THAM | 0 | 0.25 | 0 | 0.25 |
| Pentaerythritol | 0.50 | 0 | 0.50 | 0 |
| PETS | 0.20 | 0.20 | 0.20 | 0.20 |
| AO1010 | 0.05 | 0.05 | 0.05 | 0.05 |
| Sodium stearate | 0.05 | 0.05 | 0.05 | 0 |
| Properties | | | | |
| Capillary viscosity at 24/s (Pa-s) | 200.9 | 674.4 | 129.1 | 373.0 |
| Capillary viscosity at 664/s (Pa-s) | 97.5 | 170.6 | 80.1 | 128.0 |
| Capillary viscosity at 1520/s (Pa-s) | 69.8 | 118.9 | 62.7 | 102.0 |
| Capillary viscosity at 2286/s (Pa-s) | 66.4 | 97.2 | 59.1 | 83.0 |
| Capillary viscosity at 5886/s (Pa-s) | 44.3 | 65.0 | 41.6 | 54.0 |
| Tensile modulus (MPa) | 10900 | 11300 | 11300 | 12300 |
| Tensile stress at yield (MPa) | 107.0 | 110.0 | 98.8 | 107.0 |
| Tensile stress at break (MPa) | 107.0 | 110.0 | 98.8 | 107.0 |
| Tensile elongation at yield (%) | 1.7 | 1.7 | 1.5 | 2.0 |
| Tensile elongation at break (%) | 1.7 | 1.7 | 1.5 | 2.0 |
| Flexural modulus (MPa) | 8250 | 8190 | 8190 | 8760 |
| Notched Izod (J/m) | 175.0 | 175.0 | 171.0 | 175.0 |
| Unnotched Izod (J/m) | 87.2 | 90.2 | 85.7 | 90.0 |
| Retention of tensile stress (%) | | | | |
| After 7 days | 79 | 97 | 60 | 89 |
| After 14 days | 61 | 87 | 54 | 70 |
| After 21 days | 57 | 71 | — | — |

It can be seen from Table 8 that a balance of good flow properties and retention of tensile stress are obtained only when the compositions comprise a combination of the aromatic epoxy and the aminoalcohol. Comparative examples 17 and 18 comprise pentaerythritol as the polyhydric alcohol, while examples 17 and 18 comprise an aminoalcohol, tris (hydroxymethyl)aminomethane. All four examples show excellent flow properties, as demonstrated by the capillary viscosity. However, Comparative examples 17 and 18 have poorer retention of tensile stress after heat aging at 90° C. and 95% relative humidity when compared to examples 17 and 18. Example 17 shows a 71% retention after 21 days, compared to only 57% for comparative example 17, while example 18 shows a 70% retention after 14 days, compared to only 54% for comparative example 18.

While the invention has been illustrated and described in typical embodiments, it is not intended to be limited to the details shown, since various modifications and substitutions are possible without departing from the spirit of the present invention. As such, modifications and equivalents of the invention herein disclosed may occur to persons skilled in the art using no more than routine experimentation, and all such modifications and equivalents within the spirit and scope of the invention as defined by the following claims.

The invention claimed is:

1. A composition comprising,
a polyester;
0.05 to 2 weight percent, based on the total weight of the polyester, of an aminoalcohol of the formula (III)

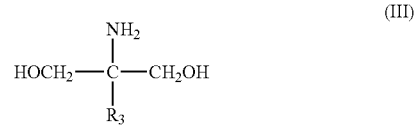

wherein $R_3$ is a C1-C20 alkyl group optionally having one or more hydroxy group substituents, a C3-C20 cycloalkyl group, a C6-C20 aryl group, a C1-C20 alkoxy group optionally having one or more hydroxy group substituents, or a C6-C20 aryloxy group; and
an aromatic epoxy compound, in an amount sufficient to provide 5 to 300 milliequivalents of epoxy per kilogram of polyester.

2. The composition of claim 1, having a spiral flow value that is 30% or more of the spiral flow value of the same composition without the aminoalcohol and aromatic epoxy compound, wherein each spiral flow is measured at a melt temperature of 250-260° C., a mold temperature of 66° C., a gauge of 1.5 mm, and a pressure of 10 MPa.

3. The composition of claim 1, having capillary viscosity that is 30% or less of the capillary viscosity of the same composition without the aminoalcohol and the aromatic epoxy compound, wherein each capillary viscosity is measured in accordance with ASTM D3865.

4. The composition of claim 1, wherein the tensile stress at yield of an article comprising the composition retains 85% or more of its initial tensile strength after aging at 90° C. for 168 hours at 95% humidity, wherein each tensile strength is measured in accordance with ASTM D638.

5. The composition of claim 1, wherein an article comprising the composition retains more of its tensile strength after aging at 90° C. for 168 hours at 95% humidity, relative to the same composition without the aromatic epoxy compound, wherein tensile strength is measured in accordance with ASTM D638.

6. The composition of claim 1, wherein the polyester comprises units of the formula (II)

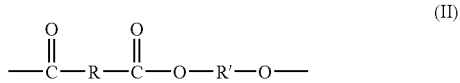

wherein R' is a C2-C20 dehydroxylated residue derived from an aryl, alkane, or cycloaliphatic diol or a chemical equivalent thereof, and R is a C6-C30 decarboxylated residue derived from an aryl, aliphatic, or cycloaliphatic diacid.

7. The composition of claim 1, wherein the polyester further comprises amide units.

8. The composition of claim 1, wherein the polyester comprises a poly(alkylene phthalate), a poly(alkylene isophthalate), a poly(alkylene terephthalate), a poly(cycloalkylene terephthalate), a poly(cycloalkylene cycloaliphatic dicarboxylate), a poly(alkylene dicarboxylate), or a combination comprising at least one of the foregoing polyesters.

9. The composition of claim 1, wherein R' is derived from an alkanediol and/or a cycloaliphatic diol or chemical equivalent thereof, and R is derived from an aromatic diacid, an aliphatic diacid, and/or a cycloaliphatic diacid or chemical equivalent thereof.

10. The composition of claim 1, wherein R is derived from a mixture of terephthalic acid and isophthalic acid or chemical equivalent thereof, and R' is derived from a C2-C4 alkanediol or chemical equivalent thereof.

11. The composition of claim 1, wherein $R_3$ is —$CH_3$, —$CH_2CH_3$, or —$CH_2OH$.

12. The composition of claim 1, wherein the aromatic epoxy compound has an epoxy equivalent weight of 100 to 3,000.

13. The composition of claim 1, wherein the aromatic epoxy compound is of the formula (IV)

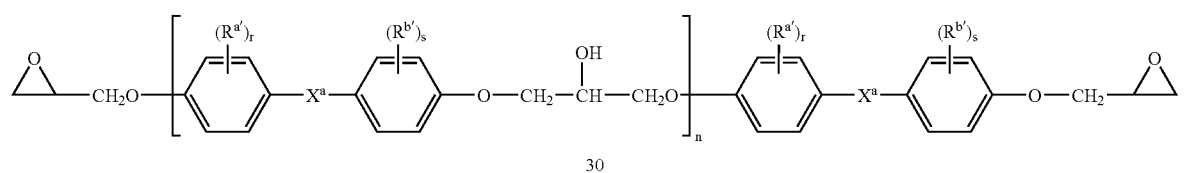

(IV)

wherein $R^{a'}$ and $R^{b'}$ are each independently halogen or C1-C12 alkyl, $X^a$ is a substituted or unsubstituted C1-C18 alkylidene bridging group or a substituted or unsubstituted C3-C18 cycloalkylidene bridging group, n is 1 to 6, and r and s are each independently 0 to 4.

14. The composition of claim 1, further comprising a catalyst, wherein the catalyst is a hydroxide, hydride, amide, carbonate, borate, phosphate, C2-C18 enolate, C2-C36 dicarboxylate, or C2-C36 carboxylate of a metal; a Lewis acid catalyst; a C1-C36 tetraalkyl ammonium hydroxide or acetate; a C1-C36 tetraalkyl phosphonium hydroxide or acetate; an alkali or alkaline earth metal salt of a negatively charged polymer; or a combination comprising at least one of the foregoing catalysts.

15. The composition of claim 14, wherein the catalyst is sodium stearate, sodium carbonate, sodium acetate, sodium bicarbonate, sodium benzoate, sodium caproate, potassium oleate, a boron compound, or a mixture comprising at least one of the foregoing salts.

16. The composition of claim 1, wherein the polyester has a molecular weight of 10,000 to 120,000 Daltons.

17. The composition of claim 1, further comprising an anti-oxidant, a filler, a colorant, a mold release agent, a nucleating agent, a UV light stabilizer, a heat stabilizer, a lubricant, or a combination comprising at least one of the foregoing additives.

18. The composition of claim 17, further comprising 5 to 50 weight percent of reinforcing filler, based on the total weight of the composition.

19. The composition of claim 18, wherein reinforcing filler comprises carbon fibers, short glass fibers, long glass fibers, mica, talc, wollastonite, clay, fibrillated tetrafluoroethylene, polyester fibers, aramid fibers, or a combination comprising at least one of the foregoing fillers.

20. The composition of claim 1, further comprising 0.1 to 25 weight percent of an acrylic impact modifier, based on the total weight of the composition.

21. The composition of claim 19, wherein the acrylic impact modifier comprises a multi-phase composite interpolymer comprising about 25 to 95 weight percent of a first acrylic electrometric phase polymerized from a monomer system comprising about 75 to 99.8% by weight C1-C14 alkyl acrylate, 0.1 to 5% by weight crosslinking member, 0.1 to 5% by weight graftlinking monomer, said crosslinking monomer being a polyethylenically unsaturated monomer having a plurality of addition polymerizable reactive groups and about 75 to 5 weight percent of a final, rigid thermoplastic acrylic or methacrylic phase polymerized in the presence of said elastomer.

22. The composition of claim 1 further comprising a polycarbonate, polyamide, polyolefin, polyphenylene ether, polyphenylene sulfide, polyetherimide, organosiloxane rubber, ethylene propylene diene monomer rubber, styrene-butadiene-styrene rubber, styrene-ethylene-butadiene-styrene rubber, acrylonitrile-butadiene-styrene rubber, methacrylate-butadiene-styrene rubber, styrene acrylonitrile copolymer or glycidyl ester impact modifier.

23. The composition of claim 1, wherein the composition further comprises a flame retarding component.

24. An article comprising the composition of claim 1.

25. The article of claim 24, wherein the article is an extruded or injection molded article.

26. The article of claim 25, in the form of a component of an electronic device.

27. A method of forming an article, comprising shaping, extruding, blow molding, or injection molding the composition of claim 1 to form the article.

28. A method of forming a composition, comprising blending the components of the composition of claim 1.

29. A composition comprising a polyester comprising units of the formula (II)

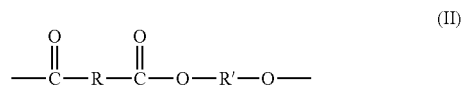

(II)

wherein R' is derived from a mixture of terephthalic acid and isophthalic acid or a chemical equivalent thereof, and R' is derived from a C2-C4 alkanediol or a chemical equivalent thereof;

0.01 to 1 weight percent, based on the total weight of the polyester, of an aminoalcohol of the formula(III)

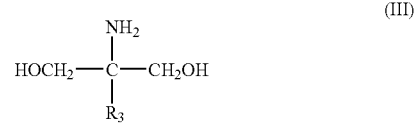

(III)

wherein $R_3$ is —$CH_3$, —$CH_2CH_3$, or —$CH_2OH$;

an aromatic epoxy compound of the formula (IV)

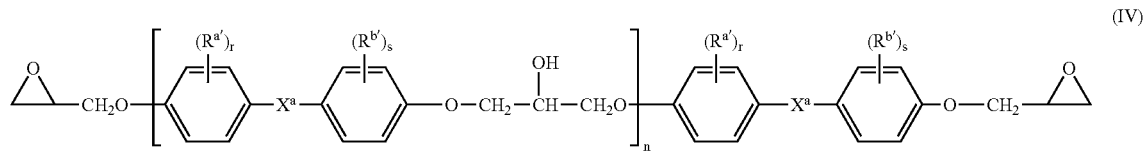

wherein $X^a$ is a substituted or unsubstituted C1-C3 alkylidene bridging group, n is 1 to 6, and r and s are each 0, in an amount sufficient to provide 5 to 150 milliequivalents of epoxy per kilogram of polyester; and a catalytically effective amount of an alkali metal salt of a C8-C36 carboxylic acid; wherein the composition has a spiral flow value that is 30% or more of the spiral flow value of the same composition without the aminoalcohol and aromatic epoxy compound, wherein each spiral flow is measured at a melt temperature of 250-260° C., a mold temperature of 66° C., a gauge of 1.5 mm, and a pressure of 10 MPa; and the tensile stress at yield of an article comprising the composition retains 85% or more of its initial tensile strength after aging at 90° C. for 168 hours at 95% humidity, wherein each tensile strength is measured in accordance with ASTM D638.

30. A composition comprising
a polyester comprising units of the formula (II)

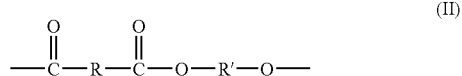

wherein R' is derived from a mixture of terephthalic acid and isophthalic acid or a chemical equivalent thereof, and R' is derived from a C2-C4 alkanediol or a chemical equivalent thereof;

0.01 to 1 weight percent, based on the total weight of the polyester, of an aminoalcohol of the formula (III)

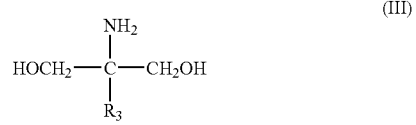

wherein $R_3$ is —$CH_3$, —$CH_2CH_3$, or —$CH_2OH$;
an aromatic epoxy compound of the formula (IV)

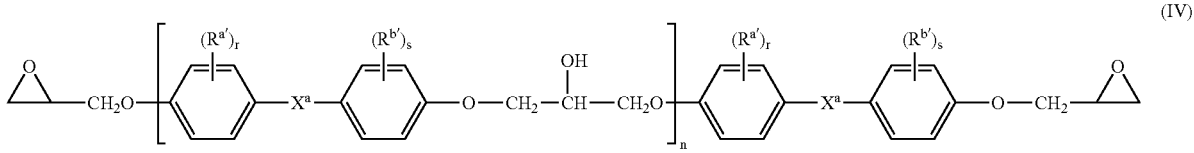

wherein $X^a$ is a substituted or unsubstituted C1-C3 alkylidene bridging group, n is 1 to 6, and r and s are each 0, in an amount sufficient to provide 5 to 150 milliequivalents of epoxy per kilogram of polyester; and a catalytically effective amount of an alkali metal salt of a C8-C36 carboxylic acid; wherein the composition has a spiral flow value that is 30% or more of the spiral flow value of the same composition without the aminoalcohol and aromatic epoxy compound, wherein each spiral flow is measured at a melt temperature of 250-260° C., a mold temperature of 66° C., a gauge of 1.5 mm, and a pressure of 10 MPa; and an article comprising the composition retains more of its tensile strength after aging at 90° C. for 168 hours at 95% relative humidity, relative to the same composition without the aromatic epoxy compound, wherein each tensile strength is measured in accordance with ASTM D638.

* * * * *